US011529974B2

(12) United States Patent
Wang et al.

(10) Patent No.: US 11,529,974 B2
(45) Date of Patent: *Dec. 20, 2022

(54) SYSTEMS AND METHODS FOR DATA MANAGEMENT

(71) Applicant: BEIJING VOYAGER TECHNOLOGY CO., LTD., Beijing (CN)

(72) Inventors: Fenglei Wang, Beijing (CN); Da Hu, Beijing (CN); Zhigang Zhang, Beijing (CN)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 80 days.

This patent is subject to a terminal disclaimer.

(21) Appl. No.: 17/143,126

(22) Filed: Jan. 6, 2021

(65) Prior Publication Data
US 2021/0155265 A1 May 27, 2021

Related U.S. Application Data

(63) Continuation of application No. 16/905,954, filed on Jun. 19, 2020, now Pat. No. 10,899,367, which is a (Continued)

(30) Foreign Application Priority Data

Dec. 29, 2018 (CN) .......................... 201811647389.3

(51) Int. Cl.
*B60W 60/00* (2020.01)
*H04L 43/10* (2022.01)
(Continued)

(52) U.S. Cl.
CPC ......... *B60W 60/0025* (2020.02); *H04L 43/10* (2013.01); *B60W 50/06* (2013.01); *B60W 2556/45* (2020.02); *H04W 84/042* (2013.01)

(58) Field of Classification Search
CPC ............. B60W 60/00; B60W 60/0025; B60W 2556/45; B60W 50/06; H04L 29/08; H04L 12/26
See application file for complete search history.

(56) References Cited

U.S. PATENT DOCUMENTS

2014/0200742 A1 7/2014 Mauti, Jr.
2015/0067179 A1 3/2015 Fleming et al.
(Continued)

FOREIGN PATENT DOCUMENTS

CN 101853478 A 10/2010
CN 102385380 A 3/2012
(Continued)

OTHER PUBLICATIONS

Qian, Cheng, The Vehicle Status Display System Design Based on the Android and on-board Diagnostics, China Master's Theses Full-text Database, 2016, 76 pages.
(Continued)

*Primary Examiner* — Tan Q Nguyen
(74) *Attorney, Agent, or Firm* — Metis IP LLC

(57) ABSTRACT

A method for data management for an autonomous vehicle may include transmitting a polling request to a first server to obtain a task. The task may be a remote task request, and the task may be associated with obtaining, from the autonomous vehicle, data related to one or more subjects via a mobile network. The method may also include receiving the task from the first server based on the polling request. The method may also include obtaining the data based on the
(Continued)

task. The method may also include transmitting the data to a second server via the mobile network.

20 Claims, 5 Drawing Sheets

Related U.S. Application Data continuation of application No. PCT/CN2018/125975, filed on Dec. 30, 2018.

(51) Int. Cl.
*H04L 29/08* (2006.01)
*B60W 50/06* (2006.01)
*H04W 84/04* (2009.01)

(56) References Cited

U.S. PATENT DOCUMENTS

| | | | |
|---|---|---|---|
| 2015/0074266 A1 | 3/2015 | Alisawi et al. | |
| 2015/0210287 A1 | 7/2015 | Penilla et al. | |
| 2017/0012812 A1 | 1/2017 | Gotoh et al. | |
| 2017/0359712 A1 | 12/2017 | Meredith et al. | |
| 2018/0376493 A1* | 12/2018 | Li | H04W 72/04 |
| 2019/0266190 A1 | 8/2019 | Naffati | |
| 2020/0162309 A1* | 5/2020 | Serban | H04B 3/56 |
| 2021/0136620 A1* | 5/2021 | Laitila | H04W 76/27 |

FOREIGN PATENT DOCUMENTS

| | | |
|---|---|---|
| CN | 106231146 A | 12/2016 |
| CN | 106302624 A | 1/2017 |
| CN | 108322512 A | 7/2018 |
| CN | 108765910 A | 11/2018 |
| CN | 108881409 A | 11/2018 |
| CN | 208060999 U | 11/2018 |
| CN | 108995614 A | 12/2018 |
| CN | 109101330 A | 12/2018 |

OTHER PUBLICATIONS

Byung-Hyug Lee et al., A Remote Control Service for OSGi-based Unmanned Vehicle Using SmartPhone in Ubiquitous Environment, Third International Conference on Computational Intelligence, Communication Systems and Networks, 2011, 6 pages.
Cheng, Cheng, Research of the Remote Monitoring System of the Vehicle Based on Android, China Master's Theses Full-text Database, 2017, 65 pages.
Jone Geun Song et al., A Design and Implementation of the Remote Control Black Box System of Vehicle Using the Smart Phone, Journal of Information and Communication Convergence Engineering, 8(6): 665-670, 2010.
The Second Office Action in Chinese Application No. 201811647389.3 dated Apr. 20, 2021, 19 pages.
International Search Report in PCT/CN2018/125975 dated Sep. 26, 2019, 4 pages.
Written Opinion in PCT/CN2018/125975 dated Sep. 26, 2019, 5 pages.

* cited by examiner

500

```
┌─────────────────────────────────────────────┐
│ Transmitting a polling request to a first server to obtain │
│ a task, wherein the task is a remote task request, and     │── 510
│ the task is associated with obtaining, from the            │
│ autonomous vehicle, requested data related to one or       │
│ more subjects of an autonomous vehicle via a mobile        │
│ network                                                    │
└─────────────────────────────────────────────┘
                        ↓
┌─────────────────────────────────────────────┐
│ Receiving the task from the first server based on the      │── 520
│ polling request,                                           │
└─────────────────────────────────────────────┘
                        ↓
┌─────────────────────────────────────────────┐
│ Obtaining the requested data based on the task             │── 530
└─────────────────────────────────────────────┘
                        ↓
┌─────────────────────────────────────────────┐
│ Transmitting the requested data to a second                │── 540
│ server via the mobile network                              │
└─────────────────────────────────────────────┘
```

FIG. 5

SYSTEMS AND METHODS FOR DATA MANAGEMENT

CROSS-REFERENCE TO RELATED APPLICATIONS

This application is a Continuation of U.S. application Ser. No. 16/905,954, filed on Jun. 19, 2020, which is a Continuation of International Application No. PCT/CN2018/125975, filed on Dec. 30, 2018, which claims priority to Chinese Patent Application No. 201811647389.3 filed on Dec. 29, 2018, the contents of each of which are incorporated herein by reference.

TECHNICAL FIELD

The present disclosure generally relates to data management, and more specifically, relates to systems and methods for transmitting data efficiently.

BACKGROUND

In some occasions, it is necessary and/or desirable to efficiently send data to remote locations, especially when the data is requested by users (e.g., back end engineers). For example, when problems arise in an autonomous vehicle testing, and these problems need to be analyzed quickly and efficiently, often requiring remote data transfer. In essence, before the back end engineers can analyze the problems, they need the data, at least the relevant data, in the autonomous vehicle properly transferred to them. The overall data generated during operation of the autonomous vehicle is generally very large (e.g., the file size of all the data may reach 1G in several minutes). However, there is usually only poor mobile network in and around the autonomous vehicle, making it difficult to send all the data related to the autonomous vehicle to remote engineers. Therefore, it is desirable to provide systems and methods that can efficiently and safely transmit requested data to remote engineers.

SUMMARY

According to a first aspect of the present disclosure, a system for data management for an autonomous vehicle may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may transmit a polling request to a first server to obtain a task. The task may be a remote task request, and the task may be associated with obtaining, from the autonomous vehicle, data related to one or more subjects via a mobile network. The one or more processors may receive the task from the first server based on the polling request. The one or more processors may obtain the data based on the task. The one or more processors may transmit the data to a second server via the mobile network.

In some embodiments, before transmitting the polling request to the first server, the one or more processors may determine that the autonomous vehicle is in a non-autonomous driving mode.

In some embodiments, the task may include the one or more subjects and a duration of the data.

In some embodiments, to obtain the data based on the task, the one or more processors may collect original data related to the one or more subjects based on the task. The one or more processors may process the collected data based on the task.

In some embodiments, the one or more processors may transmit, through the first server, a state of the task to a user terminal associated with a user in a predetermined time period.

In some embodiments, a duration of obtaining the data may be less than or equal to a duration threshold.

In some embodiments, a waiting time of the task in the first server for being processed by the autonomous vehicle may be less than or equal to a time threshold.

In some embodiments, the one or more processors may receive, from the second server, a storage location of the data in the second server. The one or more processors may transmit the storage location to a user terminal associated with a user through the first server.

According to another aspect of the present disclosure, a method for data management for an autonomous vehicle may include one or more of the following operations. One or more processors may transmit a polling request to a first server to obtain a task. The task may be a remote task request, and the task may be associated with obtaining, from the autonomous vehicle, data related to one or more subjects via a mobile network. The one or more processors may receive the task from the first server based on the polling request. The one or more processors may obtain the data based on the task. The one or more processors may transmit the data to a second server via the mobile network.

According to yet another aspect of the present disclosure, a system for data management for an autonomous vehicle may include a polling module configured to transmit a polling request to a first server to obtain a task. The task may be a remote task request, and the task may be associated with obtaining, from the autonomous vehicle, data related to one or more subjects via a mobile network. The system may also include a task receiving module configured to receive the task from the first server based on the polling request. The system may also include a collection module configured to obtain the data based on the task. The system may also include a transmission module configured to transmit the data to a second server via the mobile network.

According to yet another aspect of the present disclosure, a non-transitory computer readable medium may comprise at least one set of instructions for data management for an autonomous vehicle. The at least one set of instructions may be executed by one or more processors of a computer server. The one or more processors may transmit a polling request to a first server to obtain a task. The task may be a remote task request, and the task may be associated with obtaining, from the autonomous vehicle, data related to one or more subjects via a mobile network. The one or more processors may receive the task from the first server based on the polling request. The one or more processors may obtain the data based on the task. The one or more processors may transmit the data to a second server via the mobile network.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for data management according to some embodiments of the present disclosure.

DETAILED DESCRIPTION

Figure 1:
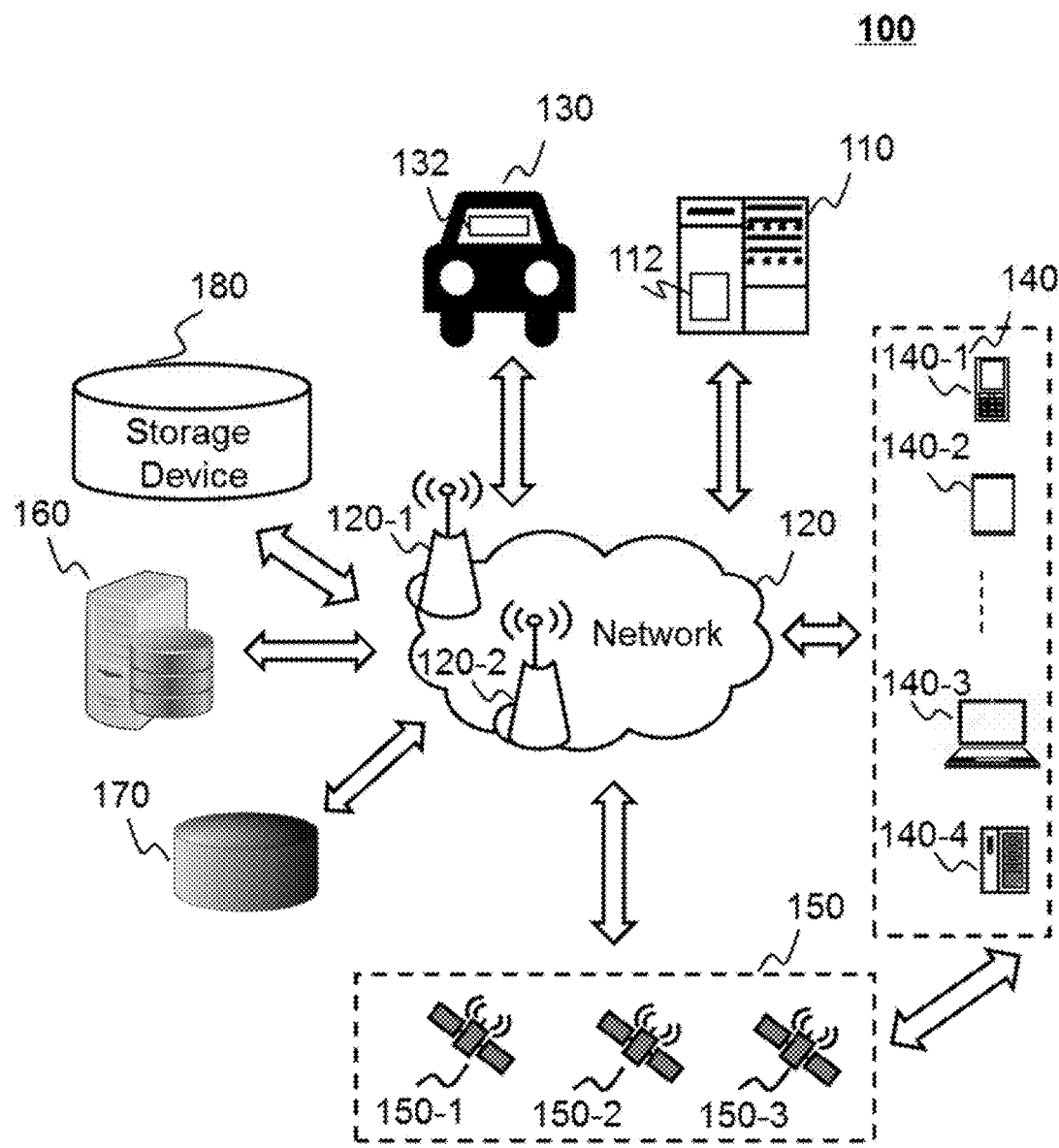
FIG. 1 is a schematic diagram illustrating an exemplary data management system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The systems and methods in the present disclosure may be applied to different scenarios in which users wants to obtain remote data in time. For example, the systems and methods in the present disclosure may be applied to smart devices. The smart device may include a smart home device (e.g., a smart lighting device, a controller of an intelligent electrical apparatus, a smart monitoring device, a smart television, a smart video camera, an interphone, etc.), a smart wearable device (e.g., a smart bracelet, a smart footgear, a smart glass, a smart helmet, a smart watch, a smart clothing, a smart backpack, a smart accessory, etc.), a smart mobile device (e.g., a smartphone, a personal digital assistance (PDA), a gaming device, a navigation device, a point of sale (POS) device, etc.), a robot, an autonomous vehicle, or the like, or any combination. The autonomous vehicle may be applied to land, ocean, aerospace, or the like, or any combination thereof. The vehicle may include a taxi, a private car, a hitch, a bus, a train, a bullet train, a high speed train, a subway, a vessel, an aircraft, a spaceship, a hot-air balloon, a driverless vehicle, a bicycle, a tricycle, a motorcycle, or the like, or any combination thereof.

For brevity, the description of the methods and/or systems for data management in the present disclosure may take autonomous vehicles as an example. It should be noted that the methods and/or systems for data management described below are merely some examples or implementations. For persons having ordinary skills in the art, the methods and/or systems for data management in the present disclosure may be applied to other similar situations, such as robots, smart home devices, smart wearable devices, smart mobile devices, etc.

It is necessary and/or desirable to efficiently and safely send remote data to users (e.g., back end engineers) to quickly solve the problems arising during the operation of an autonomous vehicle. To this end, systems and methods for data management for an autonomous vehicle in the present disclosure may transmit a polling request to a first server to obtain a task, wherein the task is a remote task request, and the task is associated with obtaining, from the autonomous vehicle, requested data related to one or more subjects (not overall data generated by the autonomous vehicle) via a mobile network. The systems and methods may receive the task from the first server based on the polling request. The systems and methods may obtain the requested data based on the task. The systems and methods may transmit the data to a file server via the mobile network.

The systems and methods for data management in the present disclosure may efficiently and safely and remotely transmit the requested data because the systems and methods pulls a task from the first server based on a polling request and transmit the requested data based on the task, instead of users actively accessing the autonomous vehicle to obtain the requested data through a virtual private network (VPN), and because the requested data may be transmit to the file server via a mobile network in the autonomous vehicle a relatively short time after the task is transmitted to the first server, instead of waiting for more than 1 week to get the requested data by delivery.

FIG. 1 is a schematic diagram of an exemplary data management system according to some embodiments of the present disclosure. The data management system 100 may include a server 110, a network 120, one or more autonomous vehicles 130, one or more user terminals 140, a positioning system 150, a database server 160, a file server 170, and a storage device 180.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the database server 160, the file server 170, and/or the storage device 180 via the network 120. As another example, the server 110 may be directly connected to the database server 160, the file server 170, and/or the storage device 180 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may update a state of a remote task request. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the data management system 100 (e.g., the server 110, the autonomous vehicle 130, the user terminal 140, the storage device 180, the positioning system 150, the database server 160, and the file server 170) may send/obtain information and/or data to/from other component(s) in the data management system 100 via the network 120. For example, the processing engine 112 may obtain a task (also referred to as a remote task or a remote task request) from the user terminal 140 and/or the autonomous vehicle 130 via the network 120. As another example, the autonomous vehicle 130 may transmit, to the server 110, a polling request to pull a task from the server 110 via the network 120. As still another example, the server 110 may transmit a task to the autonomous vehicle 130 based on the polling request via the network 120. As further another example, the autonomous vehicle 130 may transmit data required in the task to the file server 170 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth™ network, a ZigBee network, a near field communication (NFC) network, a mobile network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the data management system 100 may be connected to the network 120 to exchange data and/or information.

In some embodiments, the autonomous vehicle 130 may be a vehicle that is capable of sensing its environment and moving with little or no human input. The autonomous vehicle 130 may combine a variety of sensors to perceive the surroundings, such as radar, computer vision, Lidar, sonar, a device with positioning technology, odometer, and inertial measurement units. In some embodiments, the autonomous vehicle 130 may communicate with other positioning device (e.g., the positioning system 150) to determine the position of the autonomous vehicle 130. In some embodiments, the autonomous vehicle 130 may send positioning information to the server 110.

In some embodiments, the autonomous vehicle 130 may include a controller 132 to interpret sensory information to control the speed and the driving direction of the autonomous vehicle 130, and identify appropriate navigation paths, obstacles, and relevant signage. In some embodiments, the controller 132 may also process information and/or data to perform data management described in the present disclosure. Further, one or more nodes (e.g., robot operating system (ROS) nodes) may be added to the controller 132 to process information and/or data to perform data management described in the present disclosure. For example, the controller 132 may transmit, to the server 110, a polling request to pull a task from the server 110. As another example, the controller 132 may receive a task from the server 110 and transmit, to the file server 170, data that is related to the autonomous vehicle 130 and is required in the task. In some embodiments, the controller 132 may be similar to the server 110.

In some embodiments, the user terminal 140 may be associated with users (e.g., back end engineers) of the data management system 100. The user terminal 140 may include a mobile device 140-1, a tablet computer 140-2, a laptop computer 140-3, a built-in device in a motor vehicle 140-4, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a controller of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 140-4 may include an onboard computer, an onboard television, a traveling data recorder, etc.

In some embodiments, users (e.g., back end engineers) may transmit, to the server 110 through the user terminal 140, tasks related to obtaining, from the autonomous vehicle 130, data related to one or more subjects. In some embodiments, the user terminal 140 may receive the state of a task from the server 110 and display the task state.

The positioning system 150 may determine information associated with an object, for example, the autonomous vehicle 130 and/or the user terminal 140. In some embodiments, the positioning system 150 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location may be in the form of coordinates, such as, latitude coordinate and longitude coordinate, etc. The positioning system 150 may include one or more satellites, for example, a satellite 150-1, a satellite 150-2, and a satellite 150-3. The satellites 150-1 through 150-3 may determine the information mentioned above independently or jointly. The satellite positioning system 150 may send the information mentioned above to the network 120, or the autonomous vehicle 130 and/or the user terminal 140 via wireless connections.

The database server 160 may be a server that houses a database application that provides database services to other computer programs or computers (e.g., servers). The database application may respond to a query language. The database application may convert the query language to server-readable form and execute the converted query language to retrieve results. Exemplary database applications may include Oracle, Database 2 (DB2), Informix, Structured Query Language (SQL) server, PostgreSQL, Ingres, MySQL, or the like, or any combination thereof. In some embodiments, the database server 160 may be similar to the server 110. In some embodiments, the database server 160 may receive the task states of tasks from the server 110 and store the task states of tasks.

The file server 170 may be a server that provides a location for shared storage of files (e.g., text, image, sound, video) that can be accessed by devices that are able to reach the server via a network (e.g., the network 120). The file server 170 may not perform computational tasks or run programs on behalf of its clients (e.g., devices using the storage of the file server 170). The file server 170 may be designed primarily to enable the storage and retrieval of data while operations are carried out by its clients. In some embodiments, the file server 170 may be similar to the server 110. In some embodiments, the file server 170 may store data related to one or more subjects received from the autonomous vehicle 130 based on a task and transmit the storage location of the data to the server 110.

The storage device 180 may store data and/or instructions. In some embodiments, the storage device 180 may store data obtained from the autonomous vehicle 130, the user terminal 140, the database server 160, the file server 170, and/or the server 110. For example, the storage device 180 may store tasks transmitted from the user terminal 130 and/or the autonomous vehicle 130. In some embodiments, the storage device 180 may store data and/or instructions that may be executed or used to perform exemplary methods described in the present disclosure. For example, the storage device 180 may store instructions that the processing engine 112 may execute to update the state of a task. As another example, the storage device 180 may store instructions that the controller 132 may execute to obtain data related to the autonomous vehicle 130 based on a task. In some embodiments, the storage device 180 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 180 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 180 may be connected to the network 120 to communicate with one or more components in the data management system 100 (e.g., the server 110, the autonomous vehicle 130, the user terminal 140, the positioning system 150, the database server 160, the file server 170). One or more components in the data management system 100 may access the data or instructions stored in the storage device 180 via the network 120. In some embodiments, the storage device 180 may be directly connected to or communicate with one or more components in the data management system 100 (e.g., the server 110, the autonomous vehicle 130, the user terminal 140, the positioning system 150, the database server 160, the file server 170). In some embodiments, the storage device 180 may be part of the server 110, the controller 132, the database server 160, and/or the file server 170.

Figure 2:
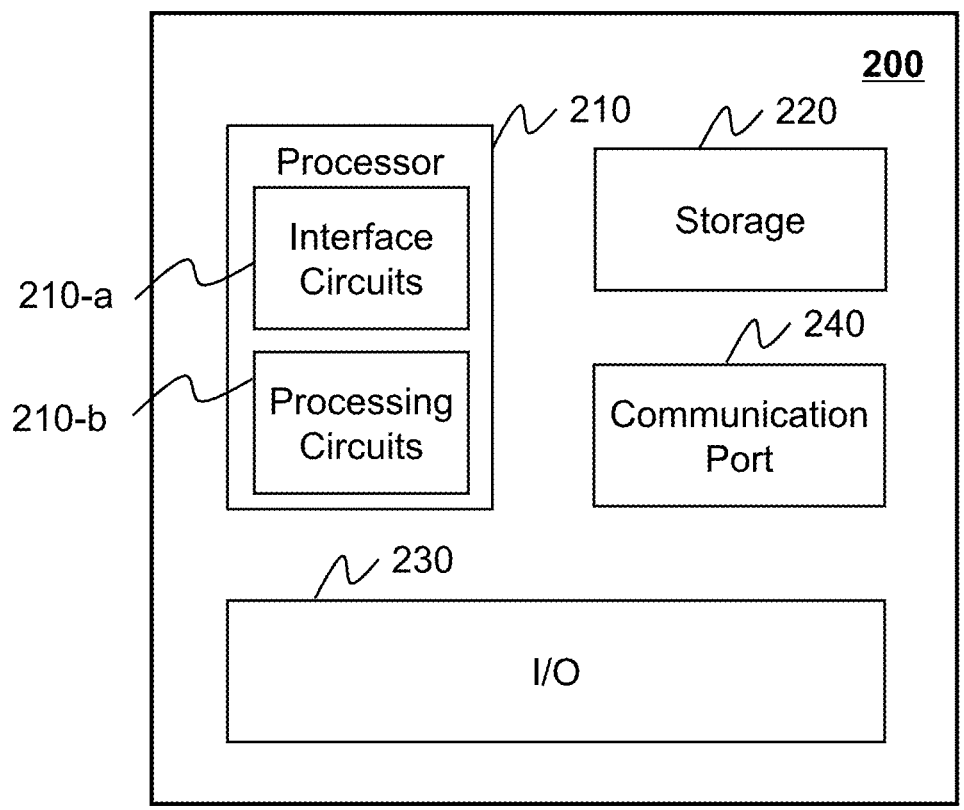
FIG. 2 is a schematic diagram illustrating exemplary hardware and/or software components of a computing device according to some embodiments of the present disclosure.

FIG. 2 is a schematic diagram illustrating exemplary hardware and/or software components of a computing device on which the server 110 (e.g., the processing engine 112), the user terminal 140, the controller 132, the database server 160, and/or the file server 170 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions in accordance with techniques described herein. For example, the processor 210 may include interface circuits 210-$a$ and processing circuits 210-$b$ therein. The interface circuits 210-$a$ may be configured to receive electronic signals from a bus (not shown in FIG. 2), wherein the electronic signals encode/include structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the controller 132 may be implemented on the computing device 200. The processor 210 may process a task and obtain data related to one or more subjects based on the task. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the autonomous vehicle 130, the user terminal 140, the database server 160, the file server 170, the storage device 180, and/or any other component of the data management system 100. For example, the server 110 may be implemented on the computing device 200. The storage 220 may store tasks received from the user terminal 140 and/or the autonomous vehicle 130. As another example, the database server 160 may be implemented on the computing device 200. The storage 220 may store the states of tasks received from the server 110. As still another example, the file server 170 may be implemented on the computing device 200. The storage 220 may store data, received from the autonomous vehicle 130, related to one or more subjects. As further another example, the controller 132 may be implemented on the computing device 200. The storage 220 may store data generated during the operation of the autonomous vehicle 130 (e.g., the sensory information collected by the sensors in the autonomous vehicle 130). In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the controller 132 may be implemented on the computing device 200. The storage 220 may store a program for the controller 132 for processing a task and obtaining data related to one or more subjects based on the task. As another example, the database server 160 may be implemented on the computing device 200. The storage 220 may store the database application.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 140, the positioning system 150, or the storage device 180. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
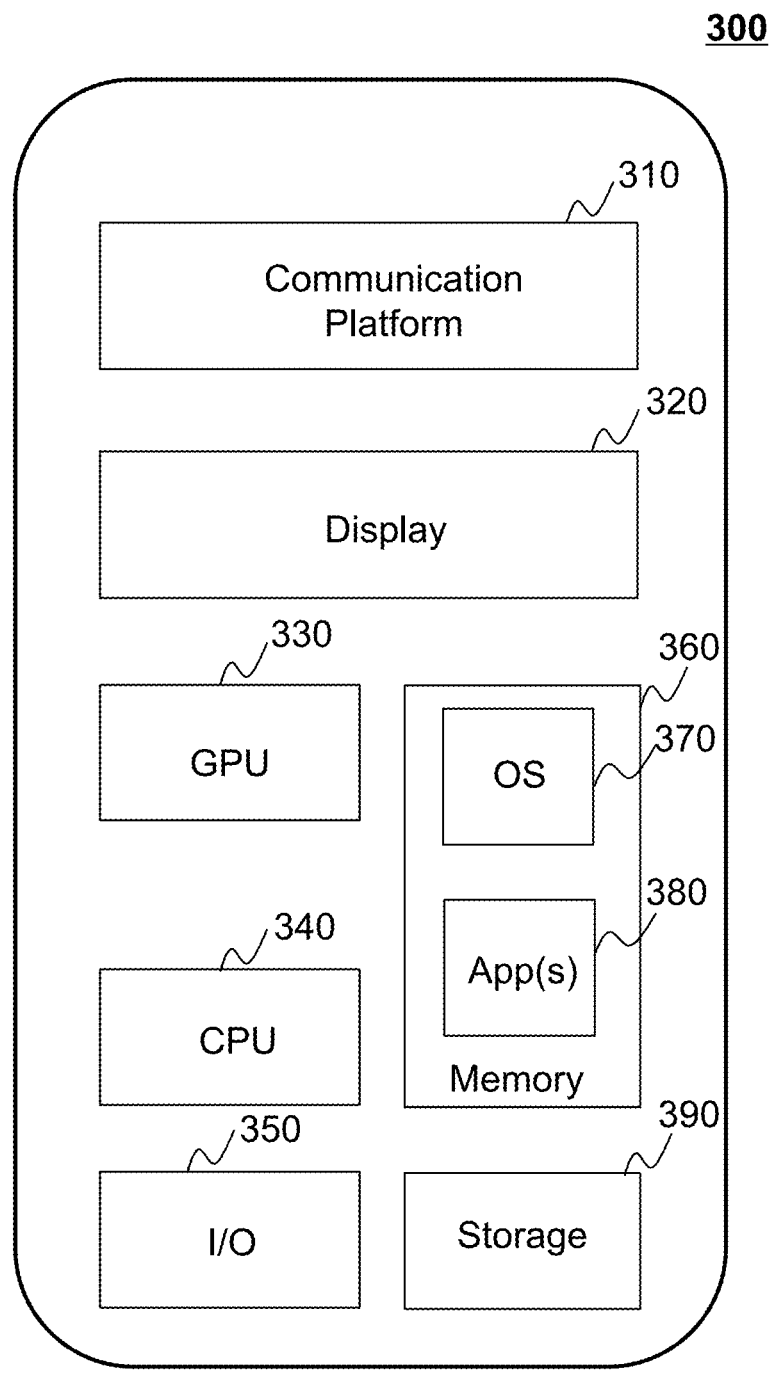
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device on which the user terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the data management system 100 or other information from the processing engine 112. User interactions with the information stream may be achieved via the I/O 350 and provided to the processing engine 112 and/or other components of the data management system 100 via the network 120. Merely by way of example, the state of a task may be displayed in the user terminal 140 through the display 320. As another example, a user may input a task through the I/O 350.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the data management system 100 performs, the element may perform through electrical signals and/or electromagnetic signals. For example, when the controller 132 processes a task, such as making a determination, or identifying information, the controller 132 may operate logic circuits in its processor to process such task. When the controller 132 receives data (e.g., a remote task) from the processing engine 112, a processor of the controller 132 may receive electrical signals encoding/including the data. The processor of the controller 132 may receive the electrical signals through one or more information exchange ports. If the processing engine 112 communicates with the controller 132 via a wired network, the information exchange port may be physically connected to a cable. If the processing engine 112 communicates with the controller 132 via a wireless network, the information exchange port of the controller 132 may be one or more antennas, which may convert the electrical signals to electromagnetic signals. Within an electronic device, such as the controller 132, the user terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage device 180), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
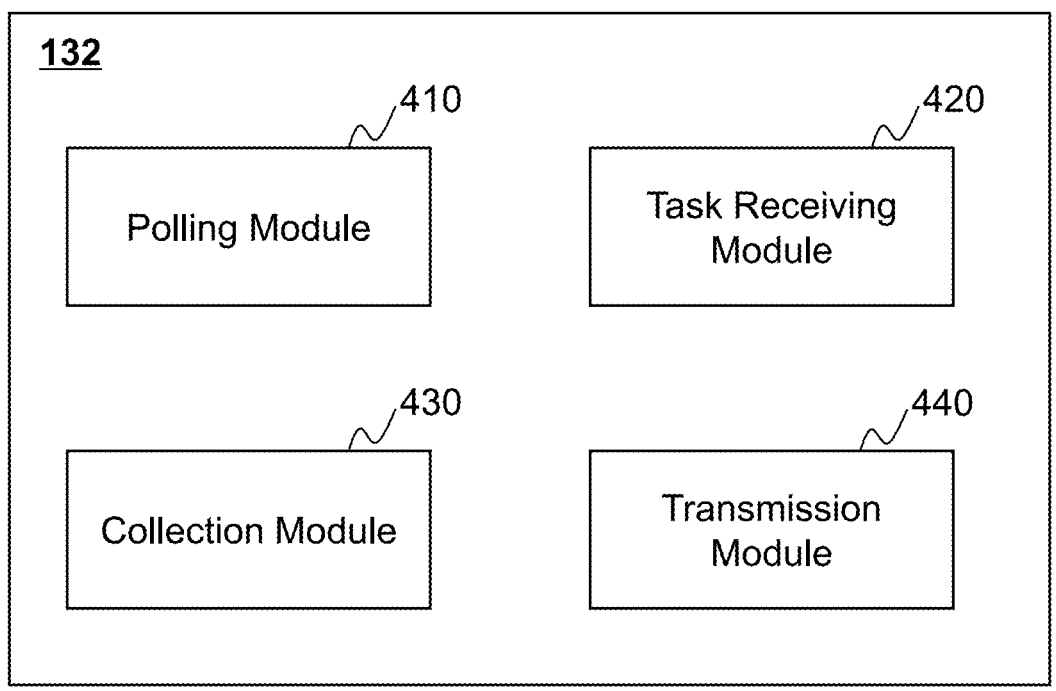
FIG. 4 is a schematic block diagram illustrating an exemplary controller for an autonomous vehicle according to some embodiments of the present disclosure.

FIG. 4 is a schematic block diagram illustrating an exemplary controller for an autonomous vehicle according to some embodiments of the present disclosure. The controller 132 may include a polling module 410, a task receiving module 420, a data collection module 430, and a transmission module 440.

The polling module 410 may be configured to transmit a polling request to the server 110 to pull a task from the server 110. The task may be a remote task request. The task may be associated with obtaining, from the autonomous vehicle 130, requested data related to one or more subjects via a mobile network.

In some embodiments, the overall data set generated during the operation of the autonomous vehicle 130 may be too big to be transmitted via a mobile network. In order to obtain data related to the autonomous vehicle 130 via the mobile network, a task related to obtaining a part of the overall data (e.g., relevant and/or requested data) may be initiated.

In some embodiments, the task may include the one or more subjects and a duration of the requested data. In some embodiments, the subject may include data sources (e.g., which sensor in the autonomous vehicle 130 collects the data), the purpose of data (e.g., the data is used to detect traffic lights, the data indicates the speed of the autonomous vehicle 130), data types (e.g., text, sound, video, image, etc.), or the like, or any combination thereof. In some embodiments, the duration may be any prior time period or any future time period. For example, the start time or the end time of the duration may be a prior time point, a current time point (e.g., the time when the task is transmitted to the server 110), or a future time point.

In some embodiments, when one or more specific conditions happen, the transmission module 440 may automatically transmit a task to the server 110. For example, when the controller 132 automatically reports an error related to one or more operational issues of the autonomous vehicle 130, the transmission module 440 may automatically transmit a task to the server 110. Merely by way of example, when the controller 132 automatically reports an error related to detecting traffic lights, the transmission module 440 may automatically transmit, to the server 110, a task including one or more subjects related to detecting traffic lights and a duration of last three days. As another example, when a driver or a test engineer manually inputs an error message related to one or more operational issues of the autonomous vehicle 130 through the controller 132 (e.g., the I/O 230 of the controller 132), the transmission module 440 may automatically transmit a task to the server 110. Merely by way of example, when a driver or a test engineer finds that the autonomous vehicle 130 make a mistake for detecting traffic lights, the driver or a test engineer may manually input an error message related to detecting traffic lights through the controller 132. The transmission module 440 may automatically transmit, to the server 110, a task including one or more subjects related to detecting traffic lights and a duration of last three days.

In some embodiments, a user (e.g., a back end engineer) may input a task through the user terminal 140. The user terminal 140 may transmit the task to the server 110. For example, if the user wants to analyze the detection of traffic lights of the autonomous vehicle 130 last three days, the user may input, through the user terminal 140, a task including one or more subjects related to detecting traffic lights and a duration of last three days.

In some embodiments, when receiving a task, the server 110 may store the task information (e.g., the one or more subjects and the duration) of the task in the database server 160.

In some embodiments, the polling module 410 may transmit the polling request to the server 110 continuously or at intervals (e.g., every 10 seconds, every 20 seconds, etc.). In some embodiments, the polling module 410 may transmit the polling request to the server 110 when the controller 132 processes no task.

In some embodiments, considering the safety of the autonomous vehicle 130, the process for obtaining requested data based on the task would be configured so that it would not affect other operations (e.g., the operations for controlling the movement of the autonomous vehicle 130) performed by the controller 132. As a result, the polling module 410 may transmit the polling request when the autonomous vehicle 130 is in a non-autonomous driving mode (e.g., a manual driving mode or a non-operating mode).

The task receiving module 420 may be configured to receive a task from the server 110 based on the polling request.

In some embodiments, in the server 110, the tasks from the autonomous vehicle 130 and/or the user terminal 140 may be arranged in a queue in chronological order of being received by the server 110. In some embodiments, for security, the active access of the server 110 to the autonomous vehicle 130 may not be allowed. Therefore, the polling module 410 may transmit a polling request to the server 110. When receiving the polling request from the polling module 410, the server 110 may transmit the first task in the queue to the task receiving module 420 in response to the polling request.

In some embodiment, when receiving a polling request from the controller 132, the server 110 may determine whether there is a task that is being processed by the controller 132 based on, for example, the state of the task. In response to a determination that there is no task that is being processed by the controller 132, the server 110 may transmit the first task in the queue to the task receiving module 420. In response to a determination that there is a task that is being processed by the controller 132, the server 110 may not transmit any task to the task receiving module 420.

The collection module 430 may be configured to obtain the requested data based on the task.

In some embodiments, the autonomous vehicle 130 may generate a large amount of original data (e.g., the size of the original data may reach 1G in several minutes) during the operation of the autonomous vehicle 130. The large amount of original data may be stored in a storage medium (e.g., the storage device 180, and/or the storage 220 of the controller 132) of the autonomous vehicle 130.

The original data generated during the operation of the autonomous vehicle 130 may be marked with one or more subjects and a timestamp. The collection module 430 may collect the requested data by comparing the subject in the task with the subject of the original data and comparing the duration in the task with the timestamp of the original data.

In some embodiments, if the end time of the duration in the task is a future time point, the collection module 430 may wait for the future time point to obtain the requested data.

In some embodiments, the collection module 430 may further process the collected data. Merely by way of example, the collection module 430 may compress the collected data (e.g., images and/or videos) that is from computer vision (e.g., cameras) in the autonomous vehicle 130. In some embodiments, the processing instruction may be included in the controller 130. For example, after collecting the original data based on the task, the collection module 430 may automatically perform the compression instructions to compress the collected data (e.g., images and/or videos) that is from computer vision (e.g., cameras). In some embodiments, the task may include the processing instructions. For example, after collecting the original data based on the task, the collection module 430 may compress the collected data (e.g., images and/or videos) that is from computer vision (e.g., cameras) based on the compression instructions in the task.

The transmission module 440 may be configured to transmit the requested data to the file server 170 via the mobile network. In some embodiments, after receiving the requested data from the autonomous vehicle 130, the file server 170 may transmit the storage location of the requested data to the server 110. Alternatively, after receiving the requested data from the autonomous vehicle 130, the file server 170 may transmit the storage location of the requested data to the controller 132 (e.g., the transmission module 440). The controller 132 (e.g., the transmission module 440) may transmit the storage location to the server 110. The server 110 may transmit the storage location of the requested data to the user terminal 140, directing the user terminal 140 to display the storage location. The server 110 may transmit the storage location of the requested data to the user terminal 140, directing the user terminal 140 to display the storage location.

In some embodiments, the file server 170 may permanently store the requested data. In some embodiments, the file server 170 may delete the requested data after a period of time (e.g., 1 week, 2 weeks, 1 month, etc.).

In some embodiments, the server 110 may update the state of the task based on the condition the task is in. The state of the task may include a state of waiting, a state of running, a state of done, and a state of error. The state of waiting indicates that the task is waiting for being processed by the controller 132 in the server 110. The state of running indicates that the task is being processed by the controller 132. The state of error indicates that there are one or more errors during processing the task and the process for processing the task is terminated. The state of done indicates that the task has been done by the controller 132 (e.g., the transmission module 440 has transmitted the requested data to the file server 170).

In some embodiments, the transmission module 440 may transmit the state of the task to the server 110 during the collection of the data. For example, because the requested data is transmitted through a mobile network, there may be a limitation to the size of the requested data. If the size of the requested data is larger than a size threshold (e.g., 10 M, 20 M, 30 M, 50 M, etc.), the transmission module 440 may transmit a message indicating that the task is in the state of error to the server 110. The server 110 may update the task state to the state of error based on the message. As another example, if the duration for obtaining the requested data is longer than a duration threshold (e.g., 10 s, 20 s, 30 s, etc.), the transmission module 440 may transmit a message indicating that the task is in the state of error to the server 110. The server 110 may update the task state to the state of error based on the message. As still another example, when the transmission module 440 transmits the requested data to the file server 170, the transmission module 440 may transmit a message indicating that the task is in the state of done to the server 110. The server 110 may update the task state to the state of done based on the message. As further another example, when the transmission module 440 does not transmit, to the server 110, a message indicating the state of the task (e.g., the state of error or the state of done) during the obtaining of the requested data in a predetermined period of time (e.g., 30 s, 40 s, 50 s, etc.), the server 110 may update the task state to the state of error.

In some embodiments, one or more nodes (e.g., ROS nodes) may be added to the controller 132. The one or more nodes may perform the process for data management in the present disclosure (e.g., the process 500 in FIG. 5). In some embodiments, one node may process one task at one time. In some embodiments, if there are a plurality of nodes, part of all of the nodes may work simultaneously. In some embodiments, the node may be referred to as a remote task executor node. In some embodiments, the polling module 410, the task receiving module 420, the collection module 430, and the transmission module 440 may be implemented on at least one of the one or more nodes.

The modules in the controller 132 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the polling module 410 and the transmission module 440 may be combined into a single module which may both transmit a polling request to the server 110 and transmit collected data to the file server 170. As another example, the collection module 430 may be divided into two units. A first unit may obtain data based on a task. A second unit may process the obtained data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the controller 132 may further include a storage module (not shown in FIG. 4). The storage module may be configured to store data generated during any process performed by any component of in the controller 132. As another example, each of components of the controller 132 may correspond to a storage module, respectively. Additionally or alternatively, the components of the controller 132 may share a common storage module.

FIG. 5 is a flowchart illustrating an exemplary process for data management according to some embodiments of the present disclosure. In some embodiments, the process 500 may be implemented in the data management system 100 illustrated in FIG. 1. For example, the process 500 may be stored in a storage medium (e.g., the storage device 180, or the storage 220 of the controller 132) as a form of instructions, and can be invoked and/or executed by the controller 132 (e.g., the processor 210 of the controller 132, or one or more modules in the controller 132 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the controller 132 (e.g., the interface circuits 210-*a* and/or the polling module 410) may transmit a polling request to the server 110 to pull a task from the server 110. The task may be a remote task request. The task may be associated with obtaining, from the autonomous vehicle 130, requested data related to one or more subjects via a mobile network.

In some embodiments, the overall data set generated during the operation of the autonomous vehicle 130 may be too big to be transmitted via a mobile network. In order to obtain data related to the autonomous vehicle 130 via the mobile network, a task related to obtaining a part of the overall data (e.g., relevant and/or requested data) may be initiated.

In some embodiments, the task may include the one or more subjects and a duration of the requested data. In some embodiments, the subject may include data sources (e.g., which sensor in the autonomous vehicle 130 collects the data), the purpose of data (e.g., the data is used to detect traffic lights, the data indicates the speed of the autonomous vehicle 130), data types (e.g., text, sound, video, image, etc.), or the like, or any combination thereof. In some embodiments, the duration may be any prior time period or any future time period. For example, the start time or the end time of the duration may be a prior time point, a current time point (e.g., the time when the task is transmitted to the server 110), or a future time point.

In some embodiments, when one or more specific conditions happen, the controller 132 (e.g., the interface circuits 210-*a* and/or the transmission module 440) may automatically transmit a task to the server 110. For example, when the controller 132 automatically reports an error related to one or more operational issues of the autonomous vehicle 130, the controller 132 may automatically transmit a task to the server 110. Merely by way of example, when the controller 132 automatically reports an error related to detecting traffic lights, the controller 132 may automatically transmit, to the server 110, a task including one or more subjects related to detecting traffic lights and a duration of last three days. As another example, when a driver or a test engineer manually inputs an error message related to one or more operational issues of the autonomous vehicle 130 through the controller 132 (e.g., the I/O 230 of the controller 132), the controller 132 may automatically transmit a task to the server 110. Merely by way of example, when a driver or a test engineer finds that the autonomous vehicle 130 make a mistake for detecting traffic lights, the driver or a test engineer may manually input an error message related to detecting traffic lights through the controller 132. The controller 132 may automatically transmit, to the server 110, a task including one or more subjects related to detecting traffic lights and a duration of last three days.

In some embodiments, a user (e.g., a back end engineer) may input a task through the user terminal 140. The user terminal 140 may transmit the task to the server 110. For example, if the user wants to analyze the detection of traffic lights of the autonomous vehicle 130 last three days, the user may input, through the user terminal 140, a task including one or more subjects related to detecting traffic lights and a duration of last three days.

In some embodiments, when receiving a task, the server 110 may store the task information (e.g., the one or more subjects and the duration) of the task in the database server 160.

In some embodiments, the controller 132 may transmit the polling request to the server 110 continuously or at intervals (e.g., every 10 seconds, every 20 seconds, etc.). In some embodiments, the controller 132 may transmit the polling request to the server 110 when the controller 132 processes no task.

In some embodiments, considering the safety of the autonomous vehicle 130, the process for obtaining requested data based on the task would be configured so that it would not affect other operations (e.g., the operations for controlling the movement of the autonomous vehicle 130) performed by the controller 132. As a result, the controller 132 may transmit the polling request when the autonomous vehicle 130 is in a non-autonomous driving mode (e.g., a manual driving mode or a non-operating mode).

In 520, the controller 132 (e.g., the interface circuits 210-*a*, and/or the task receiving module 420) may receive a task from the server 110 based on the polling request.

In some embodiments, in the server 110, the tasks from the autonomous vehicle 130 and/or the user terminal 140 may be arranged in a queue in chronological order of being received by the server 110. In some embodiments, for security, the active access of the server 110 to the autonomous vehicle 130 may not be allowed. Therefore, the controller 132 may transmit a polling request to the server 110. When receiving the polling request from the controller 132, the server 110 may transmit the first task in the queue to the controller 132 in response to the polling request.

In some embodiment, when receiving a polling request from the controller 132, the server 110 may determine whether there is a task that is being processed by the controller 132 based on, for example, the state of the task. In response to a determination that there is no task that is being processed by the controller 132, the server 110 may transmit the first task in the queue to the controller 132. In response to a determination that there is a task that is being processed by the controller 132, the server 110 may not transmit any task to the controller 132.

In 530, the controller 132 (e.g., the processing circuits 210-b, and/or the collection module 430) may obtain the requested data based on the task.

In some embodiments, the autonomous vehicle 130 may generate a large amount of original data (e.g., the size of the original data may reach 1G in several minutes) during the operation of the autonomous vehicle 130. The large amount of original data may be stored in a storage medium (e.g., the storage device 180, and/or the storage 220 of the controller 132) of the autonomous vehicle 130.

The original data generated during the operation of the autonomous vehicle 130 may be marked with one or more subjects and a timestamp. The controller 132 may collect the requested data by comparing the subject in the task with the subject of the original data and comparing the duration in the task with the timestamp of the original data.

In some embodiments, if the end time of the duration in the task is a future time point, the controller 132 may wait for the future time point to obtain the requested data.

In some embodiments, the controller 132 may further process the collected data. Merely by way of example, the controller 132 may compress the collected data (e.g., images and/or videos) that is from computer vision (e.g., cameras) in the autonomous vehicle 130. In some embodiments, the processing instruction may be included in the controller 130. For example, after collecting the original data based on the task, the controller 132 may automatically perform the compression instructions to compress the collected data (e.g., images and/or videos) that is from computer vision (e.g., cameras). In some embodiments, the task may include the processing instructions. For example, after collecting the original data based on the task, the controller 132 may compress the collected data (e.g., images and/or videos) that is from computer vision (e.g., cameras) based on the compression instructions in the task.

In 540, the controller 132 (e.g., the processing circuits 210-b, and/or the transmission module 440) may transmit the requested data to the file server 170 via the mobile network. In some embodiments, after receiving the requested data from the autonomous vehicle 130, the file server 170 may transmit the storage location of the requested data to the server 110. Alternatively, after receiving the requested data from the autonomous vehicle 130, the file server 170 may transmit the storage location of the requested data to the controller 132. The controller 132 may transmit the storage location to the server 110. The server 110 may transmit the storage location of the requested data to the user terminal 140, directing the user terminal 140 to display the storage location.

In some embodiments, the file server 170 may permanently store the requested data. In some embodiments, the file server 170 may delete the requested data after a period of time (e.g., 1 week, 2 weeks, 1 month, etc.).

In some embodiments, the server 110 may update the state of the task based on the condition the task is in. The state of the task may include a state of waiting, a state of running, a state of done, and a state of error. The state of waiting indicates that the task is waiting for being processed by the controller 132 in the server 110. The state of running indicates that the task is being processed by the controller 132. The state of error indicates that there are one or more errors during processing the task and the process for processing the task is terminated. The state of done indicates that the task has been done by the controller 132 (e.g., the controller 132 has transmitted the requested data to the file server 170). In some embodiments, when the task queues in the server 110 to wait for being transmitted to the controller 132, the server 110 may mark the task with the state of waiting. When the task is transmitted to the controller 132, the server 110 may update the task state to the state of running. If the waiting time of the task in the server 110 is longer than a waiting time threshold (e.g., 10 minutes, 20 minutes, 30 minutes, etc.), the server 110 may update the task state to the state of error.

In some embodiments, the controller 132 (e.g., the interface circuits 210-a and/or the transmission module 440) may transmit the state of the task to the server 110 during the collection of the data. For example, because the requested data is transmitted through a mobile network, there may be a limitation to the size of the requested data. If the size of the requested data is larger than a size threshold (e.g., 10 M, 20 M, 30 M, 50 M, etc.), the controller 132 may transmit a message indicating that the task is in the state of error to the server 110. The server 110 may update the task state to the state of error based on the message. As another example, if the duration for obtaining the requested data is longer than a duration threshold (e.g., 10 s, 20 s, 30 s, etc.), the controller 132 may transmit a message indicating that the task is in the state of error to the server 110. The server 110 may update the task state to the state of error based on the message. As still another example, when the controller 132 transmits the requested data to the file server 170, the controller 132 may transmit a message indicating that the task is in the state of done to the server 110. The server 110 may update the task state to the state of done based on the message. As further another example, when the controller 132 does not transmit, to the server 110, a message indicating the state of the task (e.g., the state of error or the state of done) during the obtaining of the requested data in a predetermined period of time (e.g., 30 s, 40 s, 50 s, etc.), the server 110 may update the task state to the state of error.

In some embodiments, after marking and/or updating the state of the task, the server 110 may transmit the marked and/or the updated state to the database server 110 to store the marked and/or the updated state.

In some embodiments, if the task is in the state of error or the state of done, the server 110 may remove the task from the queue. In some embodiments, for security, the server 110 may transmit the latest state of the task to the user terminal 140 in response to a polling request from the user terminal 140, instead of actively access the user terminal 140 to transmit the state of the task. The user terminal 140 may display the latest state of the task (e.g., through the display 320). In some embodiment, along with the latest state of the task, the server 110 may transmit the reason that causes the state of the task. For example, if the waiting time of the task in the server 110 is longer than the waiting time threshold, the server 110 may update the task state to the state of error. When receiving the polling request from the user terminal 140, the server 110 may transmit, to the user terminal 140, the state of error and a message indicating that the waiting time of the task in the server 110 is longer than the waiting time threshold. In this way, the users may monitor the task. In some embodiments, the users may delete or resend, through the user terminal 140, the task that is in the state of error. In some embodiments, the users may delete, through the user terminal 140, the task that is in the state of waiting. In some embodiments, if the task is in the state of running, the task may not be deleted by the server 110 or the users.

In some embodiments, when the controller 132 works well again after a break-down or when the controller 132 restarts up during processing the task, the task may be still in the state of running. When the controller 132 transmits a polling request to the server 110, the server 110 may first send the task to the controller 132.

In some embodiments, the user terminal 140 may transmit the polling request to the server 110 continuously or at intervals (e.g., every 10 s).

In some embodiments, the controller 132 may process one task at one time. In some embodiments, the controller 132 may process more than one task simultaneously.

In some embodiments, one or more nodes (e.g., ROS nodes) may be added to the controller 132. The one or more nodes may perform the process 500 for data management. In some embodiments, one node may process one task at one time. In some embodiments, if there are a plurality of nodes, part of all of the nodes may work simultaneously. In some embodiments, the node may be referred to as a remote task executor node.

The process for data management in the present disclosure may efficiently and safely transmit remote requested data because the controller 132 pulls a task from the server 110 based on a polling request and transmit the requested data based on the task, instead of users actively accessing the autonomous vehicle 130 to obtain the requested data through a virtual private network (VPN), and because the requested data may be transmit to the file server 170 via a mobile network in the autonomous vehicle a relatively short time after the task is transmitted to the server 110, instead of waiting for more than 1 week to get the requested data by delivery.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for data management for an autonomous vehicle, comprising:
   at least one storage device including a set of instructions; and
   at least one processor in communication with the at least one storage device, wherein when executing the set of instructions, the at least one processor is directed to perform operations including:
   transmitting a polling request to a first server to obtain a task associated with obtaining data related to one or more subjects, wherein the task is generated by the autonomous vehicle or input by a user through a user terminal;
   receiving the task from the first server based on the polling request;
   obtaining the data based on the task; and
   transmitting the data to a second server via the mobile network.

2. The system of claim 1, wherein when executing the set of instructions, the at least one processor is directed to perform additional operations including:
   before transmitting the polling request to the first server, determining that the autonomous vehicle is in a non-autonomous driving mode.

3. The system of claim 1, wherein the task includes the one or more subjects and a duration of the data.

4. The system of claim 1, wherein to obtain the data based on the task, the at least one processor is directed to perform additional operations including:
   collecting original data related to the one or more subjects based on the task; and
   processing the collected data based on the task.

5. The system of claim 1, wherein when executing the set of instructions, the at least one processor is directed to perform additional operations including:
   transmitting, through the first server, a state of the task to the user terminal associated with the user in a predetermined time period.

6. The system of claim 1, wherein a duration of obtaining the data is less than or equal to a duration threshold.

7. The system of claim 1, wherein a waiting time of the task in the first server for being processed by the autonomous vehicle is less than or equal to a time threshold.

8. The system of claim 1, wherein when executing the set of instructions, the at least one processor is directed to perform additional operations including:
   receiving, from the second server, a storage location of the data in the second server; and
   transmitting the storage location to the user terminal associated with the user through the first server.

9. A method for data management for an autonomous vehicle, implemented on a computing device having at least one processor and at least one storage device, the method comprising:
   transmitting a polling request to a first server to obtain a task, wherein the task is generated by the autonomous vehicle or input by a user through a user terminal, and the task is associated with obtaining, from the autonomous vehicle, data related to one or more subjects via a mobile network;
   receiving the task from the first server based on the polling request;
   obtaining the data based on the task; and
   transmitting the data to a second server via the mobile network.

10. The method of claim 9, the method further comprising:
    before transmitting the polling request to the first server, determining that the autonomous vehicle is in a non-autonomous driving mode.

11. The method of claim 9, wherein the task includes the one or more subjects and a duration of the data.

12. The method of claim 9, wherein the obtaining of the data based on the task includes:
    collecting original data related to the one or more subjects based on the task; and
    processing the collected data based on the task.

13. The method of claim 9, the method further comprising:
    transmitting, through the first server, a state of the task to the user terminal associated with the user in a predetermined time period.

14. The method of claim 9, wherein a duration of obtaining the data is less than or equal to a duration threshold.

15. The method of claim 9, wherein a waiting time of the task in the first server for being processed by the autonomous vehicle is less than or equal to a time threshold.

16. The method of claim 9, the method further comprising:
    receiving, from the second server, a storage location of the data in the second server; and
    transmitting the storage location to the user terminal associated with the user through the first server.

17. A non-transitory computer readable medium, comprising at least one set of instructions for data management for an autonomous vehicle, wherein when executed by one or more processors of a computing device, the at least one set of instructions causes the computing device to perform a method, the method comprising:
    transmitting a polling request to a first server to obtain a task, wherein the task is generated by the autonomous vehicle or input by a user through a user terminal, and the task is associated with obtaining, from the autonomous vehicle, data related to one or more subjects via a mobile network;
    receiving the task from the first server based on the polling request;
    obtaining the data based on the task; and
    transmitting the data to a second server via the mobile network.

18. The non-transitory computer readable medium of claim 17, wherein the method further comprising:
    before transmitting the polling request to the first server, determining that the autonomous vehicle is in a non-autonomous driving mode.

19. The non-transitory computer readable medium of claim 17, wherein the method further comprising:

receiving, from the second server, a storage location of the data in the second server; and transmitting the storage location to the user terminal associated with the user through the first server.

20. The non-transitory computer readable medium of claim 17, wherein the method further comprising:

transmitting, through the first server, a state of the task to the user terminal associated with the user in a predetermined time period.

\* \* \* \* \*